(12) United States Patent
Buechel et al.

(10) Patent No.: US 7,878,217 B2
(45) Date of Patent: Feb. 1, 2011

(54) VALVE DEVICE FOR SANITARY FITTING AND SANITARY FITTING

(75) Inventors: Helmut Buechel, Heerbrugg (CH); Guenther Matt, Feldkirch (AT)

(73) Assignee: Aquis Sanitaer AG, Rebstein (CH)

( * ) Notice: Subject to any disclaimer, the term of this patent is extended or adjusted under 35 U.S.C. 154(b) by 701 days.

(21) Appl. No.: 11/845,524

(22) Filed: Aug. 27, 2007

(65) Prior Publication Data

US 2008/0072965 A1 Mar. 27, 2008

(30) Foreign Application Priority Data

Aug. 30, 2006 (DE) .................. 10 2006 040 558

(51) Int. Cl.
*F16K 11/06* (2006.01)
(52) U.S. Cl. ...................... 137/625.29; 137/625.4; 137/625
(58) Field of Classification Search ........... 137/597, 137/625.4, 625.29, 599.03, 625; 251/129.04
See application file for complete search history.

(56) References Cited

U.S. PATENT DOCUMENTS

| | | | | |
|---|---|---|---|---|
| 878,023 A | * | 2/1908 | Rost, R ................. | 137/625.29 |
| 4,709,728 A | * | 12/1987 | Ying-Chung ............. | 137/636.4 |
| 4,788,998 A | * | 12/1988 | Pepper et al. ................. | 137/1 |
| 4,839,039 A | * | 6/1989 | Parsons et al. .............. | 210/143 |
| 4,960,154 A | * | 10/1990 | Dagiantis ................ | 137/625.17 |
| 6,321,786 B2 | * | 11/2001 | Schumacher ................ | 137/613 |
| 6,962,168 B2 | * | 11/2005 | McDaniel et al. ...... | 137/624.12 |
| 6,968,860 B1 | * | 11/2005 | Haenlein et al. ............ | 137/613 |
| 6,988,511 B2 | * | 1/2006 | Tang ..................... | 137/625.29 |
| 2006/0162793 A1 | | 7/2006 | Di Nunzio | |
| 2007/0044850 A1 | | 3/2007 | Pieters | |

FOREIGN PATENT DOCUMENTS

| | | | | |
|---|---|---|---|---|
| DE | 27 39 587 A1 | | 3/1979 | |
| DE | 4101955 | * | 7/1992 | |
| DE | 4324600 A1 | * | 1/1995 | ................. 137/625 |
| DE | 101 19 690 C1 | | 4/2001 | |
| DE | 34 19 208 A1 | | 11/2005 | |
| EP | 0 309 443 A1 | | 3/1989 | |

* cited by examiner

*Primary Examiner*—John Rivell
(74) *Attorney, Agent, or Firm*—Factor & Lake, Ltd.

(57) ABSTRACT

A valve device for a sanitary fitting having at least two control elements which are movable relative to one another and on which at least two inlet channels and at least one control channel are formed is described. The control channel is configured for a communicating connection between at least one of the inlet channels and at least one outlet channel, depending on the relative position of the control elements. According to a first aspect of the invention, an additional channel, which is in a permanent, communicating connection with the control channel, is provided in the valve device, thereby ensuring a communicating connection of the additional channel with at least one of the inlet channels, irrespective of the relative position of the control elements. According to a further aspect of the invention, a sanitary fitting having at least one cold-water inlet connection and at least one hot-water inlet connection is provided, which fitting includes a valve device according to the invention.

18 Claims, 4 Drawing Sheets

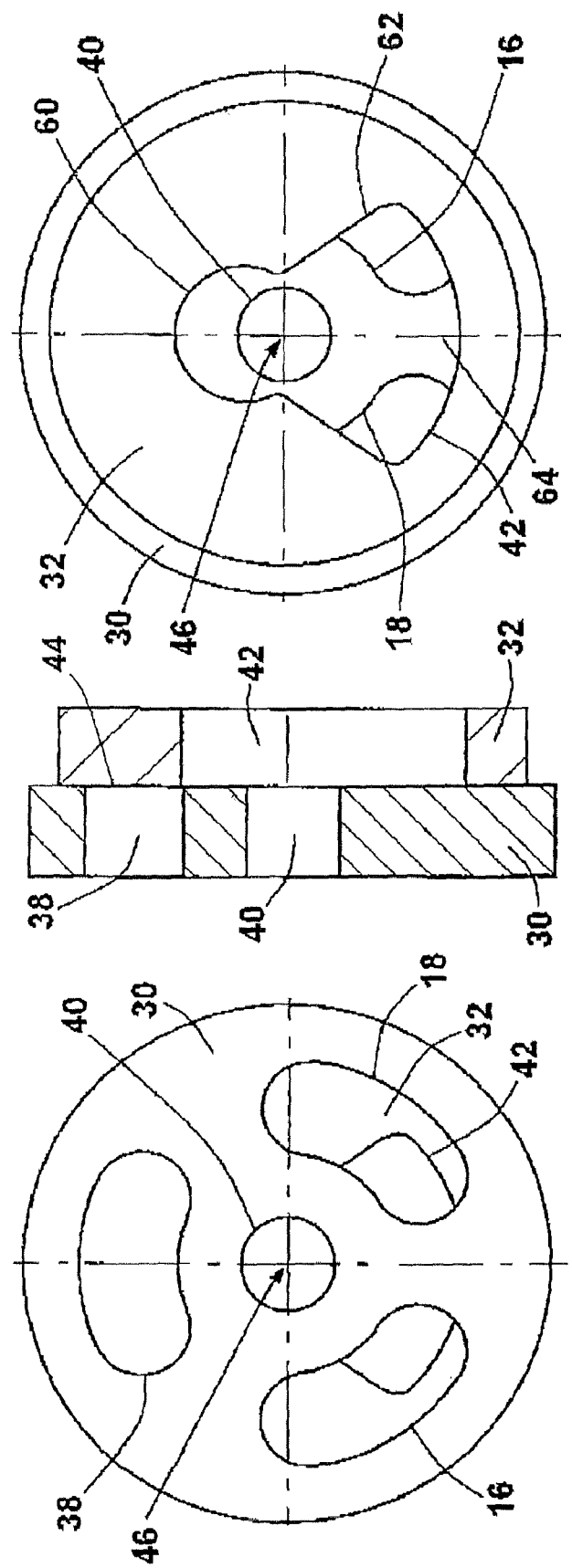

VALVE DEVICE FOR SANITARY FITTING AND SANITARY FITTING

RELATED APPLICATIONS

This application claims the filing benefit of German Patent Application No. 10 2006 040 558.7, filed Aug. 30, 2006, the contents of which are incorporated herein by reference.

TECHNICAL FIELD

The present invention relates to a valve device for a sanitary fitting having at least two control elements which are movable relative to one another and on which at least two inlet channels and at least one control channel are formed, the control channel being configured for a communicating connection between at least one of the inlet channels and at least one outlet channel, depending on a relative position of the control elements, and also to a sanitary fitting having at least one cold-water inlet connection, at least one hot-water inlet connection and having a valve device for adjusting free cross-sections of the inlet connections.

BACKGROUND OF THE INVENTION

DE OS 27 39 587 discloses a sanitary fitting referred to as a one-hand mixing valve. Its valve device includes a first control element, which is embodied as a fixed disc mounted in a spatially fixed manner in a housing body and which has inlet channels configured as through-openings. A regulating disc, displaceable in translatory and rotary fashion on the fixed disc and provided as a second control element, is provided with a control channel referred to as a regulating recess. The regulating recess can be brought into varying overlapping relationship with the through-openings of the fixed disc. Through the interaction of the two control elements, in particular through the operative connection of the regulating recess with the through-openings, free cross-sections of hot- and cold-water lines connected to the through-openings can be varied. Volume flows of cold and/or hot water can thus flow off into a common outlet channel, depending on the relative position of the control elements. The control elements thus enable an adjustment of the mixing ratio between cold and hot water and hence the adjustment of the water temperature. The control elements also enable an adjustment of the total volume flow for the mixture of cold and hot water which flows off into the common outlet channel. The known valve device is used for sanitary fittings such as those used, for example, for hand wash basins or for shower or bath tubs.

The present invention is directed to resolving these and other matters.

SUMMARY OF THE INVENTION

An object of the present invention is to provide a valve device for a sanitary fitting, and also a sanitary fitting, which enable greater versatility of use. This object may be achieved by a valve device having at least two control elements which are movable relative to one another and on which at least two inlet channels and at least one control channel are formed. The control channel is configured for a communicating connection between at least one of the inlet channels and at least one outlet channel, depending on a relative position of the control elements, wherein an additional channel which is in a permanent, communicating connection with the control channel is provided, thereby ensuring a communicating connection of the additional channel with at least one of the inlet channels, irrespective of the relative position of the control elements, and by a sanitary fitting having at least one cold-water inlet connection and at least one hot-water inlet connection; further having a valve device for adjusting free cross-sections of the inlet connections.

According to a first aspect of the invention, the above valve device includes an additional channel, which is in a permanent, communicating connection with the control channel thereby ensuring a communicating connection of the additional channel with at least one of the inlet channels, irrespective of the relative position of the control elements. The additional channel can be connected in a communicating manner to an outlet of a sanitary fitting and thereby enables the provision of a permanent volume flow of water between the at least one inlet channel and the outlet.

In a preferred embodiment of the invention, the control channel is designed for a, preferably continuous, adjustment of free opening cross-sections of the inlet channels, depending on the relative position of the control elements. This enables an adjustment of volume flows of the fluids which are respectively provided at the inlet channels and which flow through the control channel into the outlet channel and/or into the additional channel. A for example a mixing ratio between flows of cold and hot water which is provided at the inlet channels can thus be adjusted. In a preferred embodiment of the invention, the control valve is designed in such a way that a rotary relative movement of the control elements causes a change of the ratio of the free cross-sections of the inlet channels and thus the change of a mixing ratio of the fluids provided.

It is expedient if the control channel is designed for a, preferably continuous, adjustment of a free opening cross-section of the outlet channel. This allows a free adjustment of the volume flow flowing off into the outlet channel and provided at the inlet channels. Preferably, it can thereby be ensured that the flowing-off volume flow can be controlled independently of the adjustment of the ratio of the free opening cross-sections of the inlet channels. This means that, on provision of cold and hot water at the inlet channels, the temperature of the flowing-off water can be adjusted independently of a volume flow of the flowing-off water. In a particularly preferred embodiment of the invention, the control channel is designed in such a way that a translatory relative movement of the control elements causes an adjustment of the free opening cross-section of the outlet channel.

In a further refinement of the invention, it is provided that the control channel is configured in such a way that the communicating connection of the additional channel with the inlet channels is independent of the relative position of the control channel. It is thereby ensured that the mixing ratio of the fluids, provided in the control channel, for the additional channel is identical to the mixing ratio of the fluids in the outlet channel. A user can, for example, thus adjust the water temperature at the outlet channel by adjusting the relative position of the control elements. The thereby adjusted water temperature is then also present for the water mixture provided at the additional channel. Thus, with a common adjustment of the control elements, the volume flows provided for the outlet channel as well as for the additional channel have the same mixing ratio with regard to the fluids provided at the inlet channels. The water temperature at the additional channel thus does not depend on whether the outlet channel is opened by the control elements or not.

It is expedient if at least one control element is produced from a ceramic material. The use of ceramic material for at least one control element makes it possible to create a lowwear, lastingly sealing valve device. This applies particularly when all the control elements are produced from ceramic materials.

In a preferred embodiment of the invention, the control elements lie with plane surfaces regionally sealingly against one another. This constitutes an advantageous configuration for the sealing surfaces, since plane surfaces, in particular when using ceramic materials, can be produced with high precision at low costs by polishing methods.

In a preferred embodiment of the invention, the inlet channels, the outlet channel, the control channel and the additional channel are realised on the control elements. The channels can thus be coordinated with one another in an advantageous manner with regard to their geometrical configuration, since they are substantially independent of the sanitary fitting into which the valve device is to be installed. In addition, this enables functional testing of the control elements independently of the sanitary fitting, since the control of the volume flows is performed directly by the control elements.

It is expedient if a first control element is provided with the inlet channels, with the outlet channel and with the additional channel. All the channels, which are typically connected to corresponding supply and discharge lines provided on the sanitary fitting, are thus realised on one control element. This control element can thereby be advantageously fixedly installed in a valve cartridge or directly in the sanitary fitting. The supply and discharge lines in the sanitary fitting can be embodied as rigid pipes and/or as bores. Flexible connections between the channels of the control elements and the supply and discharge lines are not required.

In a further refinement of the invention, it is provided that the second control element is provided with the control channel. The second control element thus serves for variably influencing the free opening cross-sections of the inlet channels and for controlling the free opening cross-section of the outlet channel. For this purpose, the second control element is movably arranged in the sanitary fitting. Since the second control element interacts directly with the first control element and no communicating connections to the sanitary fitting are necessary, a valve device which is simple to assemble and cost-effective can thus be realised.

In a preferred embodiment of the invention, the inlet channels and the outlet channel are formed as annulus segments concentrically, in particular with equal angular division, on the first control element. This configuration makes it possible to realise a distribution, which is uniform and thus advantageous particularly when using ceramic material, of internal stresses in the material of the first control element. Internal stresses can occur particularly due to temperature differences of the fluids provided at the inlet channels, particularly with hot and cold water. The channels embodied as annulus segments can each be provided at the ends with roundings to avoid notch effects. The rounding radius of the roundings preferably corresponds to half the width of the annulus segments.

In a further refinement of the invention, it is provided that the additional channel, in particular embodied as a through-bore, is arranged concentrically with the inlet channels and the outlet channel on the first control element. A space-saving arrangement of the additional channel can thus be realised. In addition, this ensures in a simple manner that the additional channel is always in communicating connection with at least one inlet channel via the control channel, irrespective of the rotary and/or translatory relative position of the control elements.

In a further refinement of the invention, it is provided that the control channel is designed in such a way that the maximum cross-section of the outlet channel which can be freed by the control channel corresponds at least substantially to the cross-section of the additional channel. The effect achieved by this is that, on maximum opening of the outlet channel by the control channel, substantially equal volume flows can flow off from the inlet channels onto the outlet channel and onto the additional channel.

It is expedient if the control channel has an opening comprising a first region with a preferably cylindrical cross-section and a second region with a triangle-like cross-section. When the valve device is assembled, the first region of the opening is arranged in the region of the additional channel provided in the first control element. The second region of the opening is arranged above the annulus-segment-shaped inlet channels provided in the first control element and enables the position-dependent freeing of the inlet channels. Since the first and the second region of the opening are in communicating connection, the desired permanent communicating connection between at least one inlet channel and the additional channel is realised, irrespective of the relative position of the control elements. In a preferred embodiment of the invention, the control elements are embodied in the form of discs, and the channels of one control element and also the opening of the other control element are arranged mirror-symmetrically with respect to a centre axis of the discs. Furthermore, in a particularly preferred embodiment of the invention, it can be provided that the inlet and outlet channels of one control element are oriented rotationally symmetrically with respect to the centre axis of the discs.

According to a further aspect of the invention, a sanitary fitting having at least one cold-water inlet connection and at least one hot-water inlet connection is provided, which fitting includes a valve device according to the invention. In a sanitary fitting, it can be provided that the outlet channel is connected in a communicating manner to a first outlet designed without a valve. Additionally or alternatively, it can be provided that the additional channel is connected in a communicating manner to a second outlet, which is provided with an outlet valve for opening and closing a free cross-section of the outlet. A sanitary fitting which has only one outlet without a valve is provided with a valve device according to the invention merely for reasons of cost saving, since there is no use for the additional channel. Since, however, the valve device in a preferred embodiment is designed to be fully compatible with known valve devices which are intended exclusively for sanitary fittings without a second outlet, a cost advantage can be achieved by the higher production rates for the valve device according to the invention. The same applies to a sanitary fitting which is equipped solely with an outlet which has an outlet valve and in which the valve device serves only for adjusting the water temperature.

The particular advantage of the valve device according to the invention lies in the fact that it can be used in both of the aforementioned types of sanitary fittings. Furthermore, the valve device according to the invention can also be used for a sanitary fitting which has both an outlet without a valve and an outlet with a valve device and which thus has an extended functional range as compared with known sanitary fittings. Besides the reduction of production costs due to higher production rates for the valve device, logistic costs are also reduced, since only one type of valve device now needs to be kept available for the three differently designed sanitary fittings described above.

It is expedient if the outlet valve has an actuator which is designed for a remote, in particular external-power-actuated, control of the outlet valve. An actuator can be embodied in particular as a hydraulically or pneumatically controllable cylinder, as a magnet coil or as a piezoelectric movement transducer. A remote control of the outlet valve is practical particularly in sanitary fittings on washstands for large-scale catering establishments, medical practices or hospitals. At these places, strict hygiene or disinfection requirements have to be observed. For instance, it may be stipulated that, after cleaning one's hands using water from the sanitary fitting, the actuating lever, which sanitary fittings typically have for adjusting the quantity of water and the water temperature, must not be touched any more. For this reason, there may be provision, for example, for a foot actuation of the sanitary fitting, by which at least the quantity of water can be influenced.

In an advantageous embodiment of the invention, a user can preclean his/her hands, for example, at a first washstand on which the sanitary fitting according to the invention is mounted. In doing so, the user can use the operating lever of the sanitary fitting to set a pleasant water temperature and a sufficient quantity of water. After completion of the first handwashing procedure, the water flow is terminated by the operating lever of the sanitary fitting. The user then moves to an adjacent washstand which is connected via an outlet to the additional channel of the valve device in the sanitary fitting. The additional channel is, for example, equipped with an outlet valve which can be controlled by a foot switch. At this washstand, the user can now perform final hand cleaning, with the water temperature previously selected at the operating lever being maintained and the metering of the water flow being carried out by means of the foot switch.

In a preferred embodiment of the invention, a contactlessly switching sensor device is designed for producing a control signal which is provided for a, preferably electrical, control of the actuator. The outlet valve can thus be controlled in a completely contactless manner. Preferably, the contactlessly switching sensor device is embodied as a light barrier or as a capacitive proximity sensor and produces an electrical switching signal by which the actuator can be controlled. In a particularly preferred embodiment of the invention, the sensor device is mounted in the sanitary fitting in the region of the outlet, so that an approaching object, in particular the user's hand, coming into a detection range of the sensor device gives rise to a switching signal and results in a water flow from the second outlet.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

FIG. 2 shows a front view of a valve device, formed from two control discs, in a neutral closed position, FIG. 3 shows a lateral sectional illustration of the control discs according to FIG. 2, FIG. 4 shows a rear view of the two control discs according to FIGS. 2 and 3.

DETAILED DESCRIPTION OF THE PRESENT INVENTION

Figure 1:
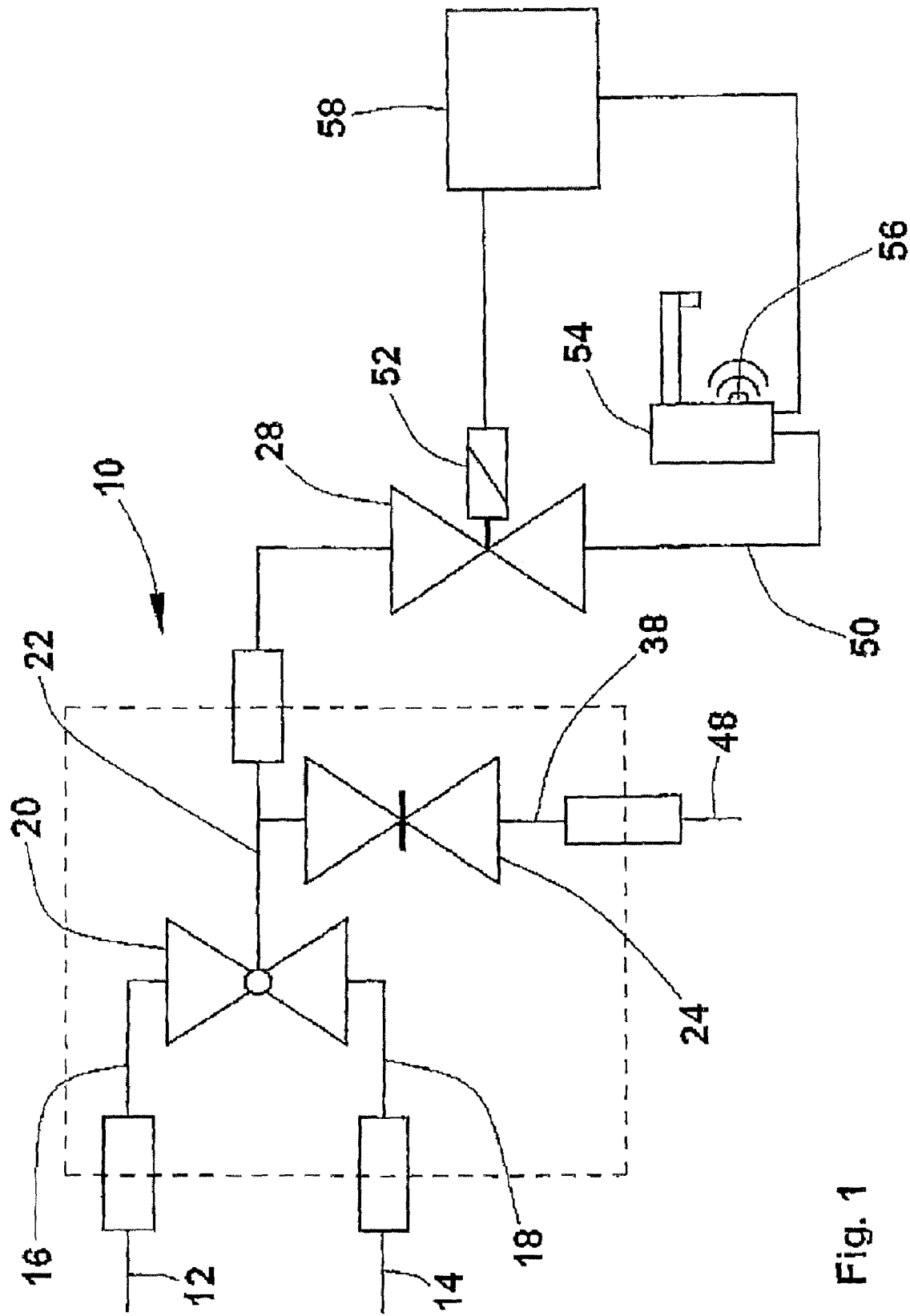
FIG. 1 shows a schematic illustration of a valve device according to the invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

A valve device 10 is provided as an independent assembly, also referred to as a mixing cartridge, for use in a sanitary fitting (not illustrated), in particular in a water tap for a washstand. In the sanitary fitting there are provided supply lines 12, 14 which are connected to a first inlet channel 16 for hot water and to a second inlet channel 18 for cold water of the valve device 10.

The valve device 10 has, according to the hydraulic connection diagram of FIG. 1, a mixing valve 20, to which the first inlet channel 16 and the second inlet channel 18 are connected. The mixing valve 20 enables mixing of the hot water provided by the first inlet channel 16 with the cold water provided by the second inlet channel 18 in a continuously adjustable mixing ratio. A more detailed description of the functioning of the mixing valve 20 for carrying out the mixing operation is given in the following description for FIGS. 2 to 7. The water mixed by the mixing valve 20 is delivered to a mixing channel 22. The mixing channel 22 is connected, inside the valve device 10, to a separately illustrated shutoff valve 24, which is provided for opening or closing an outlet channel 38 which leads into a first outlet 48.

The shutoff valve 24 can be controlled together with the mixing valve 20 by means of an operating lever (not illustrated). In this case, the operating lever can be designed in such a way that a pivoting movement about a first movement axis leads to an adjusting movement for the mixing valve 20. In contrast, a pivoting movement about a second pivot axis, preferably oriented orthogonally to the first pivot axis, leads to an adjusting movement for the shutoff valve 24. It is thus possible, with the aid of a single operating lever, to influence both a volume flow and a temperature of the water flowing out of the outlet 48.

The mixing channel 22 is continued by an additional channel 38, to which is assigned an electrically controllable outlet valve 28 provided outside the valve device 10. The outlet valve 28 is realised with an electrically controllable solenoid switch 52 provided as an actuator. The outlet valve 28 is connected between the permanently pressurised mixing channel 22 and a second outlet 50. As a result, it is possible to influence a water flow from the supply lines 12, 14 into the outlet 50 independently of the position of the valve device 10. For the control of the solenoid switch 52, a sensor device in the form of an infrared sensor 56 is mounted on a sanitary fitting 54. When objects or a user's hands approach the infrared sensor 56, it produces a switching signal which is converted in a control unit 58 into a switching signal for the solenoid switch 52. The solenoid switch 52 controls the outlet valve 28, which opens the second outlet 50, allowing the water to emerge from the mixing channel 22. Since the temperature of the water flowing in the mixing channel 22 depends on the mixing ratio set at the mixing valve 20, and the second outlet 50 is likewise connected to the mixing channel 22, the water flowing out at the outlet valve 28 is also at the temperature preset at the mixing valve 20.

The interfaces between the supply lines 12, 14 and the inlet channels 16, 18 and between the mixing channel 22 and the outlet valve 28 can be embodied, for example, as sealed screw connections.

In the exemplary embodiment, described in more detail below, according to FIGS. 2 to 7, the mixing valve 20 and the shutoff valve 24 are embodied in a common assembly.

The valve device 10, illustrated in a neutral closed position in FIGS. 2 to 4, has a first control element, embodied as a first control disc 30, and a second control element, embodied as a second control disc 32. Both control discs 30, 32 are produced in each case as plane-parallel cylinder sections from a ceramic material. Opposite surfaces of the control discs 30, 32 are embodied as flat, plane sealing surfaces 44 with a particularly smooth, in particular polished, surface. The first control disc 30 has three substantially similarly shaped, annulus-segment-shaped openings 16, 18, 38, arranged concentrically with a centre axis 46. The openings 16, 18, 38 are each rounded at the ends with a radius corresponding substantially to the slot width of the openings 16, 18, 38. The openings 16, 18, 38 are arranged at an angular division of 120 degrees with respect to one another and are each radially symmetrically designed. The opening 16 serves as the first inlet channel, while the opening 18 serves as the second inlet channel. The first inlet channel 16 and the second inlet channel 18 are connected (in a manner not illustrated) to supply lines of the sanitary fitting (not illustrated) for hot and cold water. The outlet 38 is provided as the outlet channel and is connected (in a manner not illustrated) to the mixing channel 22 illustrated schematically in FIG. 1. Provided concentrically with the channels 16, 18, 38 is an additional channel 40, which is formed as a cylindrical bore in the first control disc 30 and the function of which will be explained in more detail below.

The first control disc 30 has a larger diameter and is provided as a fixed disc for spatially fixed installation in a mixer cartridge or directly in a sanitary fitting. The second control disc 32, which has a smaller diameter, lies with the sealing surface 44 on the first sealing disc 30 and is provided with a control opening embodied as a control channel 42. The control channel 42 in the present embodiment is completely broken through for production-related reasons. From the hydraulic point of view, it would be sufficient for the control channel 42 to be realised as a recess, facing the first control disc 30, in the second control disc 32. The control channel 42 has a keyhole-like cross-section. The cross-section of the control channel 42 is composed of a first, substantially circular-cylindrical opening region 60 and a second, triangle-like opening region 62, which are connected to one another in a communicating manner. The two opening regions 60, 62 are mirror-symmetrical with respect to the centre plane of the control disc 32.

The interaction of the channels 16, 18, 38, 40 and 42 can be seen from the illustrations of FIGS. 2 to 7. In FIGS. 2 to 4, the control discs 30, 32 are in a neutral closed position. In this case, the control disc 32 is arranged concentrically with the control disc 30 and its plane of symmetry is aligned with the plane of symmetry of the other control disc 30. In this position, the control channel 42 frees in each case the same opening cross-section for the two inlet channels 16 and 18. Thus, on condition that the water pressures are the same in both inlet channels 16, 18, a mixture with equal proportions from the two inlet channels 16, 18 is available in the control channel 42. The control channel 42 forms at the same time also the mixing channel 22. The mixture of hot and cold water present in the control channel 42 can only flow off into the additional channel 40, since the outlet channel 38 is closed by the second control disc 42. Flowing-off of the mixture into the additional channel 40 takes place, however, only if the outlet valve (not illustrated in FIGS. 2 to 7) is open, otherwise no volume flow takes place in the valve device 10.

Figure 5:
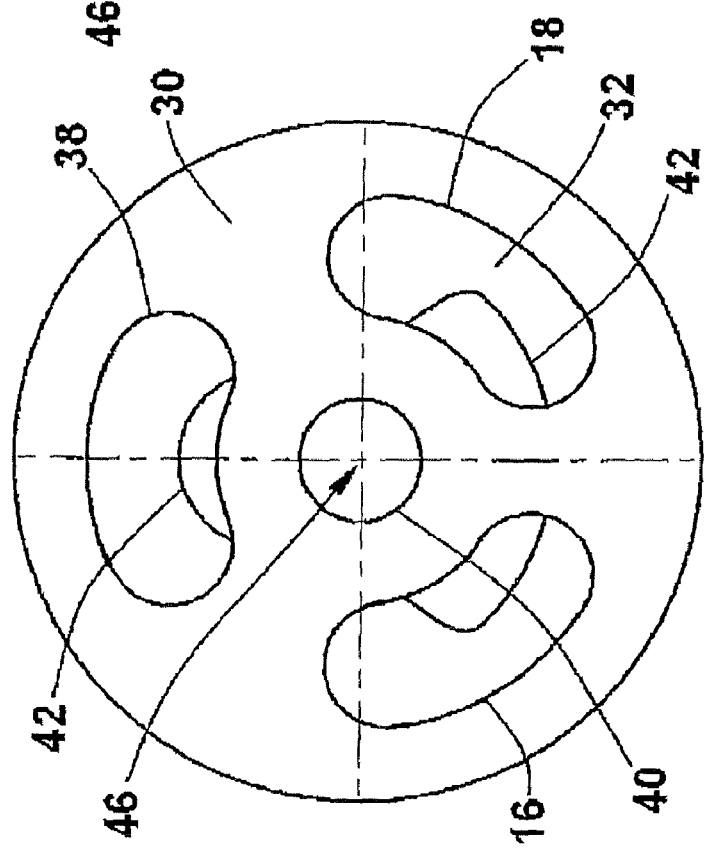
FIG. 5 shows a front view of the control discs according to FIG. 2 in a central open position.

In the illustration according to FIG. 5, the second control disc 42 no longer occupies the concentric position relative to the first control disc 40. Rather, the second control disc 42 is arranged in a manner displaced such that the control channel 42 projects beyond the outlet channel 38 and thus frees a cross-section through which the water can flow into the outlet channel 38. The keyhole-like configuration of the control channel 42 ensures that, despite the translatory displacement of the control disc 32, there are in each case sufficient, free cross-sections of the two inlet channels 16, 18 to be able to supply both the outlet channel 38 and the additional channel 40 with a sufficient quantity of water. In the position of the control disc 42 according to FIG. 5, both the outlet channel 38 and the additional channel 40 are supplied with virtually equal volume flows.

Figure 6:
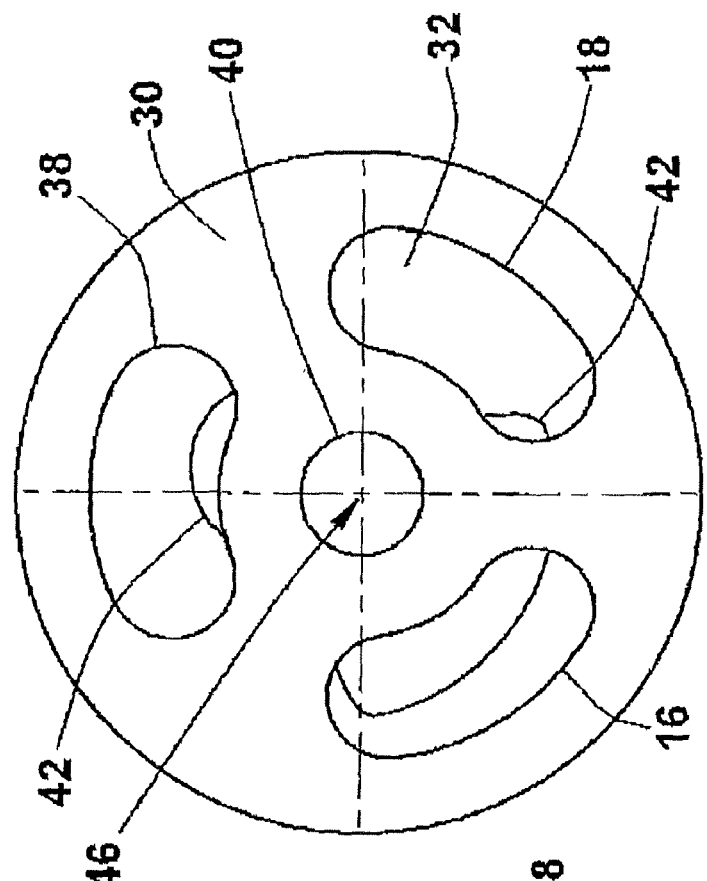
FIG. 6 shows a front view of the control discs according to FIG. 2 in a deflected open position.

The same applies also to the position of the second control disc 42 according to FIG. 6, in which a rotation about the centre axis 46 has taken place. Owing to the rotation, the control channel 42 is displaced and narrows the free cross-section of the second inlet channel 18, so that the cold water available there now has only a small proportion of the mixture in the control channel 42. In contrast, the free cross-section of the first inlet channel 16 is enlarged, so that the proportion of the hot water, flowing through the first inlet channel 16, in the control channel 42 predominates. In FIG. 6, the control channel 42 supplies both the additional channel 40 and the outlet channel 38 with a mixture consisting predominantly of hot water.

Figure 7:
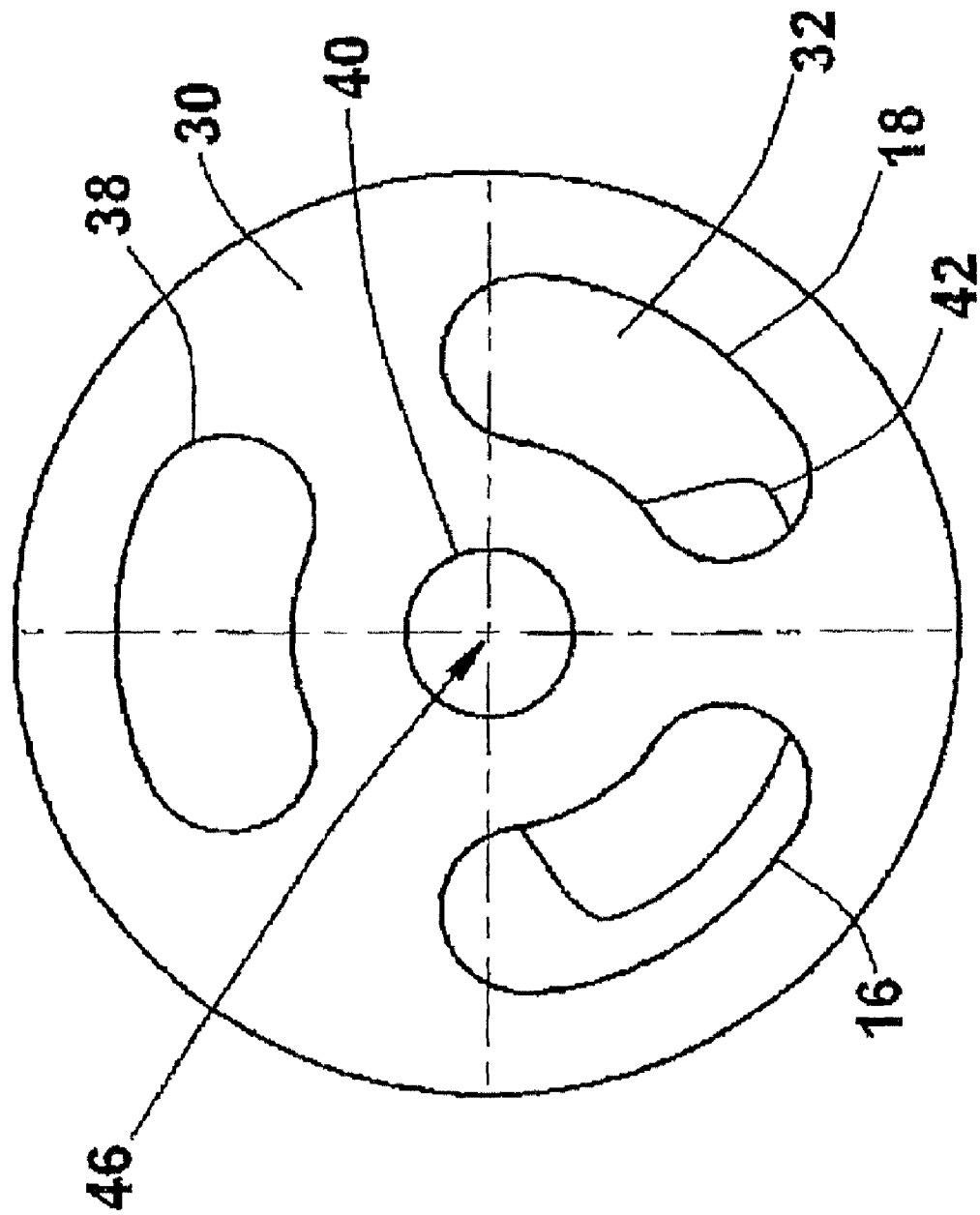
FIG. 7 shows a front view of the control discs according to FIG. 2 in a deflected closed position.

According to FIG. 7, a translatory movement of the control disc 32 has once again been carried out, with the result that the outlet channel 38 has been closed again and the mixture in the control channel 42 can be supplied exclusively to the additional channel 40, provided that the outlet valve (not illustrated) is open.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A valve device for a sanitary fitting having at least two control elements which are movable relative to one another and on which at least two inlet channels and at least one control channel are formed, the control channel being configured for a communicating connection between at least one of the inlet channels and at least one outlet channel, depending on a relative position of the control elements, wherein
   an additional channel, which is in a permanent, communicating connection with the control channel, is provided, thereby ensuring a communicating connection of the additional channel with at least one of the inlet channels, irrespective of the relative position of the control elements.

2. The valve device of claim 1, wherein the control channel is designed for a, preferably continuous, adjustment of free opening cross-sections of the inlet channels, depending on the relative position of the control elements.

3. The valve device of claim 1, wherein the control channel is designed for adjustment of a free cross-section of the outlet channel.

4. The valve device of claim 2, wherein the control channel is configured in such a way that the communicating connection of the additional channel with the inlet channels is independent of the relative position of the control channel.

5. The valve device of claim 1, wherein at least one control element is produced from a ceramic material.

6. The valve device of claim 1, wherein the control elements lie with plane surfaces regionally sealingly against one another.

7. The valve device of claim 1, wherein the inlet channels, the outlet channel, the control channel and the additional channel are realised on the control elements.

8. The valve device of claim 7, wherein a first control element is provided with the inlet channels, with the outlet channel, and with the additional channel.

9. The valve device of claim 7, wherein the second control element is provided with the control channel.

10. The valve device of claim 7, wherein the inlet channels and the outlet channel are formed as annulus segments concentrically on the first control element.

11. The valve device of claim 7, wherein the additional channel is arranged concentrically with the inlet channels and the outlet channel on the first control element.

12. The valve device of claim 1, wherein the control channel is designed in such a way that the maximum cross-section of the outlet channel which can be freed by the control channel corresponds at least substantially to the cross-section of the additional channel.

13. The valve device of claim 1, wherein the control channel has an opening comprising a first region with a cylindrical cross-section and a second region with a triangle-like cross-section.

14. A sanitary fitting having at least one cold-water inlet connection, at least one hot-water inlet connection, and having a valve device for adjusting free cross-sections of the inlet connections, wherein, the valve device includes at least two control elements which are movable relative to one another and on which at least two inlet channels and at least one control channel are formed, the control channel being configured for a communicating connection between at least one of the inlet channels and at least one outlet channel, depending on a relative position of the control elements, wherein an additional channel, which is in a permanent, communicating connection with the control channel, is provided, thereby ensuring a communicating connection of the additional channel with at least one of the inlet channels, irrespective of the relative position of the control elements.

15. The sanitary fitting of claim 14, wherein the outlet channel is connected in a communicating manner to a first outlet designed without a valve.

16. The sanitary fitting of claim 14, wherein the additional channel is connected in a communicating manner to a second outlet, which is provided with an outlet valve for opening and closing a free cross-section of the outlet.

17. The sanitary fitting of claim 16, wherein the outlet valve has an actuator which is designed for a remote control of the outlet valve.

18. The sanitary fitting of claim 17, further comprising a contactlessly switching sensor device capable of producing a control signal which facilitates control of the actuator.

* * * * *